(12) United States Patent
Kinugawa et al.

(10) Patent No.: US 8,593,031 B2
(45) Date of Patent: Nov. 26, 2013

(54) STATOR AND ELECTRIC MOTOR (75) Inventors: Hiroyuki Kinugawa, Tokyo (JP); Hiroyuki Ogura, Tokyo (JP); Tatsuhiro Ujiie, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 528 days.

(21) Appl. No.: 12/886,767

(22) Filed: Sep. 21, 2010

(65) Prior Publication Data

US 2011/0298329 A1 Dec. 8, 2011

(30) Foreign Application Priority Data

Jun. 3, 2010 (JP) .................................. 2010-127964

(51) Int. Cl.
*H02K 3/52* (2006.01)
*H02K 3/18* (2006.01)
*H02K 15/02* (2006.01)

(52) U.S. Cl.
USPC .................... 310/208; 310/194; 310/216.074; 310/216.111; 310/254.1

(58) Field of Classification Search
USPC .................... 310/194, 208, 216.008, 216.074, 310/216.111
See application file for complete search history.

(56) References Cited

U.S. PATENT DOCUMENTS

| 3,877,142 | A  | * | 4/1975  | Hamano et al. ................. 29/596 |
| 5,859,486 | A  | * | 1/1999  | Nakahara et al. ...... 310/216.004 |
| 6,992,417 | B1 | * | 1/2006  | Yamada ........................ 310/194 |
| 7,026,739 | B2 | * | 4/2006  | Okada et al. ................... 310/194 |
| 7,187,099 | B1 | * | 3/2007  | Morimatsu et al. ........... 310/194 |
| 7,200,917 | B2 | * | 4/2007  | Takano et al. ................... 29/596 |
| 7,213,324 | B2 | * | 5/2007  | Takano ........................... 29/596 |
| 7,291,955 | B2 | * | 11/2007 | Otsuji ........................... 310/194 |
| 7,626,303 | B2 |   | 12/2009 | Watanabe et al. |
| 8,390,155 | B2 | * | 3/2013  | Busch et al. ............... 310/12.21 |
| 8,461,734 | B2 | * | 6/2013  | Sahara et al. ................... 310/71 |
| 2004/0051417 | A1 | * | 3/2004 | Yamazaki et al. ............ 310/216 |
| 2006/0279146 | A1 | * | 12/2006 | Ishigami et al. ................ 310/71 |
| 2009/0085422 | A1 | * | 4/2009 | Kusawake et al. ............ 310/216 |

FOREIGN PATENT DOCUMENTS

| JP | 2002-101596 A | 4/2002 |
| JP | 2003-304668 A | 10/2003 |
| JP | 3741600 B2 | 2/2006 |
| JP | 2008-167604 A | 7/2008 |

* cited by examiner

*Primary Examiner* — Burton Mullins
(74) *Attorney, Agent, or Firm* — Birch, Stewart, Kolasch & Birch, LLP (57) ABSTRACT A stator includes an iron core 3 in which a plurality of teeth 2 are connected into an integral body, and coil wires 5 each of which is wound in series around each set of a predetermined number of teeth included in the plurality of teeth. Each of the coil wires 5 is routed in a slanting direction between opposed faces of two adjacent teeth 2 in each set of the predetermined number of teeth 2, so that each of the coil wires makes a transition from a wire wound around one of them 2 to a wire wound around the other tooth 2.

14 Claims, 11 Drawing Sheets

STATOR AND ELECTRIC MOTOR

BACKGROUND OF THE INVENTION

1. Field of the Invention

The present invention relates to a stator in which one coil wire is wound around each set of a plurality of teeth, and an electric motor equipped with this stator.

2. Description of Related Art

A stator mounted in an electric motor is provided with an iron core in which a plurality of teeth are connected into an integral body. An insulator (an insulating material) is attached to each of the plurality of teeth, and a coil wire is wound around this insulator. In this case, the plurality of teeth are divided into three sets (corresponding to the U-phase, the V-phase, and the W-phase of the electric motor respectively), and one coil wire is wound around each of the three sets of teeth. In this case, it is necessary to route the coil wire between two teeth. So, in a conventional stator, by extending the coil wire wound around the insulator across an outside portion of the insulator (i.e., a portion on a back yoke side), this coil wire is made to reach another insulator (for example, see patent references 1 and 2).

[Patent reference 1] JP,3741600,B
[Patent reference 2] JP,2008-167604,A

A problem with the conventional stator is however that because the coil wire is made to extend across the outside portion of the insulator when routing the coil wire between two teeth, it is necessary to increase the size of the insulator, especially the thickness of the insulator on a side of the back yoke so as to prevent the insulator from yielding to the tensile strength caused by the coil wire. Another problem is that because the coil wire is arranged also in the outside portion of the insulator, it is difficult to ensure the insulation distance between the coil wire arranged in the outside portion of the insulator and the case of the electric motor enclosing the stator and therefore there is a possibility that a short circuit occurs between the coil wire arranged in the outside portion of the insulator and the case of the electric motor. A further problem is that because it is necessary to make the coil wire extend across the outside portion of the insulator, the time required to wind the coil wire around the insulator and the cost of facilities required for the winding increase, and the length of the coil wire wound around the insulator increases.

SUMMARY OF THE INVENTION

The present invention is made in order to solve the above-mentioned problems, and it is therefore an object of the present invention to provide a stator that can downsize insulators thereof, can ensure the insulation distance between a coil wire and an outer case thereof, and can reduce the time required to wind the coil wire around each insulator, the cost of facilities required for the winding, and the length of the coil wire wound around each insulator by routing the coil wire between teeth without extending the coil wire across an outside portion of each insulator, and an electric motor equipped with this stator.

In accordance with the present invention, there is provided a stator including an iron core in which a plurality of teeth are connected into an integral body, and coil wires each of which is wound in series around each set of a predetermined number of teeth, in which each of the coil wires is routed in a slanting direction between the opposed faces of two adjacent teeth in each set of the predetermined number of teeth, so that each of the coil wires makes a transition from a wire wound around one of the teeth to a wire wound around another one of the teeth.

Because the stator in accordance with the present invention is constructed as above, each of the coil wires is routed between adjacent teeth without extending the coil wire across an outside portion of an insulator, and each of the coil wires is arranged only in an inside portion of the insulator. Therefore, downsizing of the insulator can be achieved, and the insulation distance between each of the coil wires and the stator's outer case can be ensured. Furthermore, the time required to wind each of the coil wires around the insulator, the cost of facilities required for the winding, and the length of each of the coil wires wound around the insulator can be reduced.

Further objects and advantages of the present invention will be apparent from the following description of the preferred embodiments of the invention as illustrated in the accompanying drawings.

BRIEF DESCRIPTION OF THE DRAWINGS

FIGS. 2(a) to 2(c) are views showing a winding process of winding a coil wire around an iron core in the stator in accordance with Embodiment 1 of the present invention.

FIGS. 5(a) and 5(b) are views showing a winding process of winding a coil wire around an iron core in the stator in accordance with Embodiment 2 of the present invention.

FIGS. 6(a) and 6(b) are views showing a process of bending the iron core in the stator in accordance with Embodiment 2 of the present invention.

FIGS. 7(a) and 7(b) are views showing the structure of an iron core in a stator in accordance with Embodiment 3 of the present invention.

FIGS. 8(a), 8(b) and 8(c) are views showing the structure of the iron core in the stator in accordance with Embodiment 3 of the present invention.

FIGS. 9(a) and 9(b) are views showing a part of a coil wire wound around a first tooth in the stator in accordance with Embodiment 3 of the present invention.

FIGS. 10(a) and 10(b) are views showing a part of a coil wire wound around a second tooth in the stator in accordance with Embodiment 3 of the present invention.

FIGS. 11(a) and 11(b) are views showing a part of a coil wire wound around a third tooth in the stator in accordance with Embodiment 3 of the present invention, FIGS. 12(a) and 12(b) are views showing a part of a coil wire wound on the iron core in the stator in accordance with Embodiment 3 of the present invention.

DETAILED DESCRIPTION OF THE PREFERRED EMBODIMENTS

Hereafter, the preferred embodiments of the present invention will be explained in detail with reference to the drawings.
Embodiment 1

Figure 1:
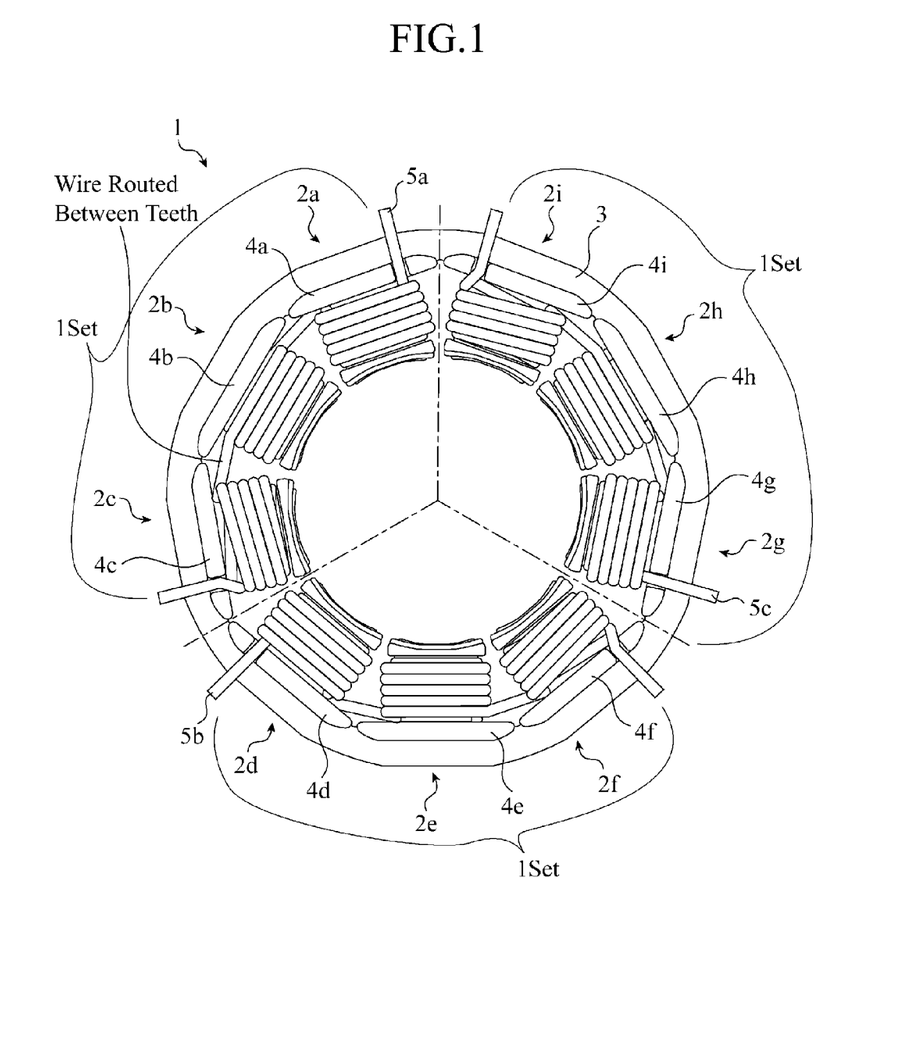
FIG. 1 is a top plan view showing the structure of a stator in accordance with Embodiment 1 of the present invention.

As shown in FIG. 1, a stator 1 is comprised of an iron core 3 in which a plurality of teeth 2 (2a to 2i) are arranged in a circular form and are connected into an integral body, insulators 4 (4a to 4i) each made from a resin (an insulating material) and attached to a tooth 2, for preventing the iron core 3 from being scratched when coil wires 5 are wound on the iron core 3, and for insulating the iron core 3 from the coil wires 5, and the coil wires 5 (5a to 5c) wound around the insulators 4.

As shown in FIG. 1, the plurality of teeth 2 are divided into three sets (corresponding to the phase U, the phase V, and the phase W of an electric motor 20 respectively) with three adjacent teeth 2 being defined as one of the three sets. One coil wire 5 is wound around each of these three sets of teeth 2. As shown in FIG. 2(c), between any two adjacent teeth 2 in each set of teeth (e.g., between the tooth 2a and the tooth 2b), one coil wire 5 is routed in a slanting direction between the opposed faces of both the teeth 2 (between a left longer side of the insulator 4a and a right longer side of the insulator 4b).

Figure 2:
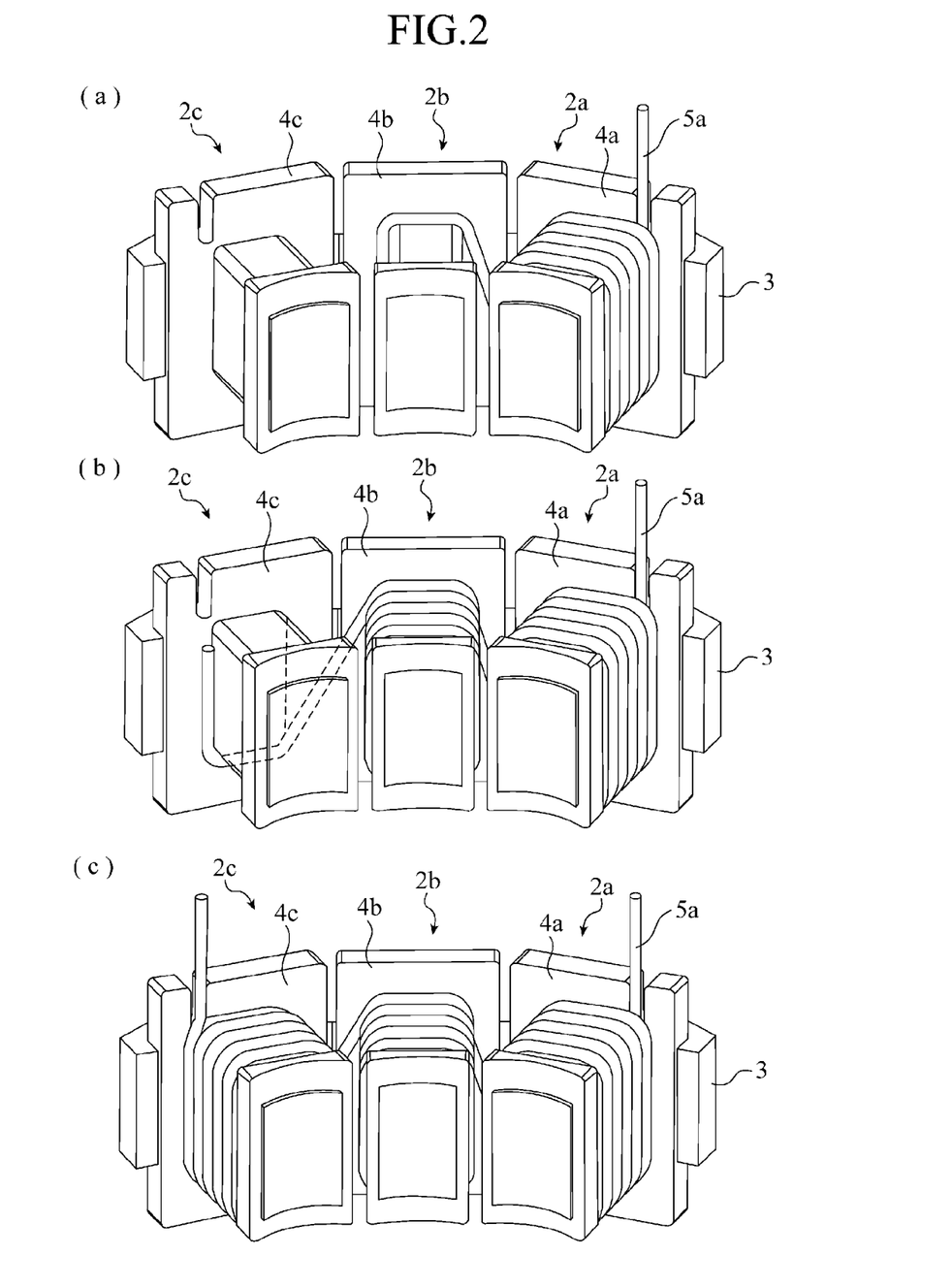
FIG. 2(a) is a perspective view showing routing of the coil wire from a first tooth to a second tooth.
FIG. 2(b) is a perspective view showing routing of the coil wire from the second tooth to a third tooth.
FIG. 2(c) is a perspective view showing the completion of the winding.

Next, a winding process of winding the coil wires 5 on the iron core 3 which is constructed as mentioned above will be explained. In FIG. 2, only one set of teeth 2 (the teeth 2a to 2c) is shown while being extracted from the iron core 3 shown in FIG. 1. In the winding process of winding the coil wires 5 on the iron core 3, a not-shown coil winding machine winds the coil wire 5a around the insulator 4a of the first tooth 2 (the tooth 2a) first. In this case, a winding method of winding the coil wire 5a around the insulator 4a is the same as a conventional winding method, and the coil winding machine winds the coil wire 5a in a first layer a predetermined number of times in a clockwise direction and in a direction from a basal portion of the insulator 4a on a side of the right longer side of the insulator toward an end portion of the insulator. Then, the coil winding machine winds the coil wire 5a in a second layer a predetermined number of times in a clockwise direction and in a direction from the end portion of the insulator 4a toward the basal portion of the insulator 4a. When winding the coil wire 5a in the second layer, the coil winding machine carries out normal winding at the four corners of the insulator 4a in such a way that the coil wire 5a is fitted into grooves formed by the coil wire 5a in the first layer wound around the insulator.

Then, the coil winding machine routes the coil wire 5a from the tooth 2a toward the second tooth 2 adjacent to the tooth 2a (i.e., the tooth 2b), as shown in FIG. 2(a). At that time, the coil winding machine routes the coil wire 5a in a slanting direction from the left end of the lower shorter side of the insulator 4a toward the right end of the upper shorter side of the insulator 4b between the left longer side of the insulator 4a and the right longer side of the insulator 4b.

The coil winding machine then winds the coil wire 5a around the insulator 4b. At that time, the coil winding machine winds the coil wire 5a in a first layer a predetermined number of times in a counterclockwise direction and in a direction from a basal portion of the insulator 4b on a side of the upper shorter side of the insulator toward an end portion of the insulator 4b. Then, the coil winding machine winds the coil wire 5a in a second layer a predetermined number of times in a counterclockwise direction and in a direction from the end portion of the insulator 4b toward the basal portion of the insulator 4b.

Then, the coil winding machine routes the coil wire 5a from the tooth 2b toward the third tooth 2 adjacent to the tooth 2b (i.e., the tooth 2c), as shown in FIG. 2(b). At that time, the coil winding machine hangs the coil wire 5a in a slanting direction from the left end of the upper shorter side of the insulator 4b toward the right end of the lower shorter side of the insulator 4c between the left longer side of the insulator 4b and the right longer side of the insulator 4c.

The coil winding machine then winds the coil wire 5a around the insulator 4c. At that time, the coil winding machine winds the coil wire 5a in a first layer a predetermined number of times in a clockwise direction and in a direction from a basal portion of the insulator 4c on a side of the lower shorter side of the insulator toward an end portion of the insulator 4c. Then, the coil winding machine winds the coil wire 5a in a second layer a predetermined number of times in a clockwise direction and in a direction from the end portion of the insulator 4c toward the basal portion of the insulator 4c.

Accordingly, as shown in FIG. 2(c), the coil winding machine can wind the coil wire 5a around the teeth 2a to 2c. The length of the coil wire 5a wound around the tooth 2b is shorter by the length of the left longer side than the length of the coil wire 5a wound around each of the teeth 2a and 2c. After that, the coil winding machine similarly winds the coil wires 5b and 5c around the two remaining sets of teeth 2 (the teeth 2d to 2f and the teeth 2g to 2i) respectively so as to construct the stator 1.

Although the directions in which the coil wire 5 is wound around any two adjacent teeth 2 in each set (e.g., the teeth 2a and 2b) differ from each other, it is possible to cause the electric motor 20 in which the stator 1 is mounted to operate without any problems by using a program for controlling the operation of a not-shown rotor including magnets and that of the electric motor 20.

As mentioned above, the stator in accordance with this Embodiment 1 is constructed in such a way that when a coil wire 5 is routed between two adjacent teeth 2, the coil wire 5 is routed in a slanting direction between the opposed faces of the two adjacent teeth 2, and the coil wire 5 is arranged only in the inside portion of the insulator 4. Therefore, because the coil wire 5 is not arranged in the outside portion of the insulator 4, and no tension caused by the coil wire 5 is applied to the outside portion of the insulator 4 (i.e., a side of the back yoke), the size of the insulator 4, especially the thickness of the insulator on a side of the back yoke can be reduced, and this size reduction can contribute to a weight reduction.

Figure 3:
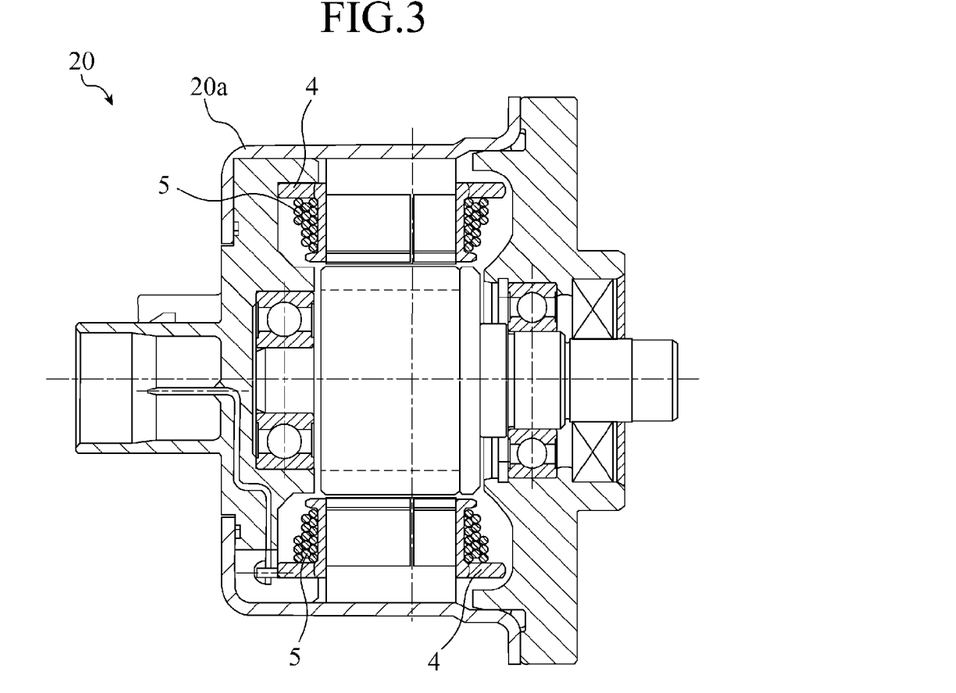
FIG. 3 is a cross-sectional view for explaining the insulation distance between a coil wire and a stator outer case in the stator in accordance with Embodiment 1 of the present invention.

Furthermore, because the coil wire 5 is not arranged in the outside portion of the insulator 4, the insulation distance between the coil wire 5 and an outer case 20a of the stator 1 can be ensured easily, as shown in FIG. 3, and occurrence of a short circuit can be prevented. In addition, because it becomes unnecessary to make the coil wire 5 extend across the outside portion of the insulator 4 when winding the coil wire 5 around the insulator, the time required to wind the coil wire around the insulator and the length of the coil wire wound around the insulator can be reduced. Furthermore, facilities required for the winding can be simplified, and the cost of the facilities required for the winding can be reduced.

Embodiment 2

Figure 4:
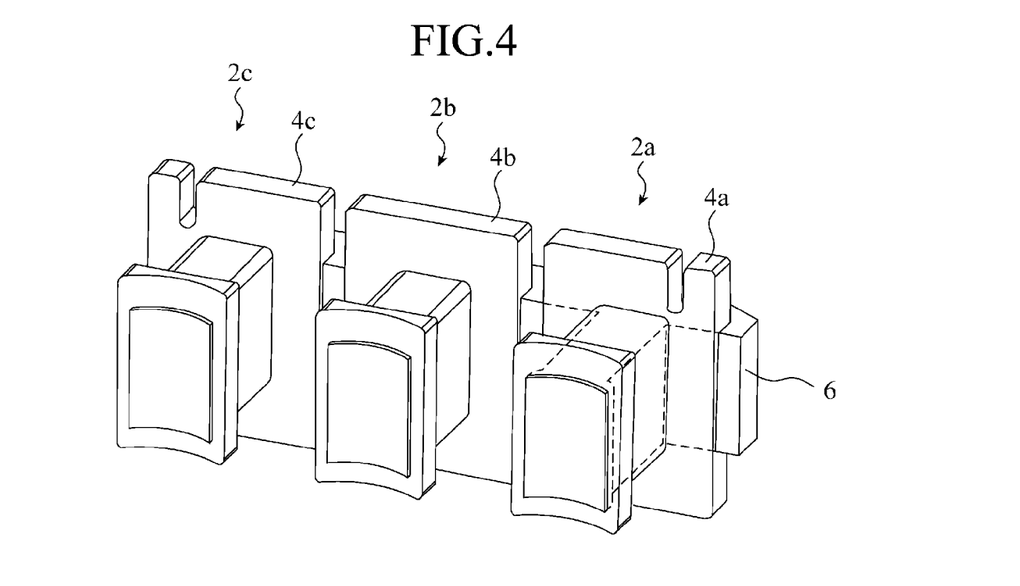
FIG. 4 is a perspective view showing the structure of an iron core in the stator in accordance with Embodiment 2 of the present invention.
Figure 5:
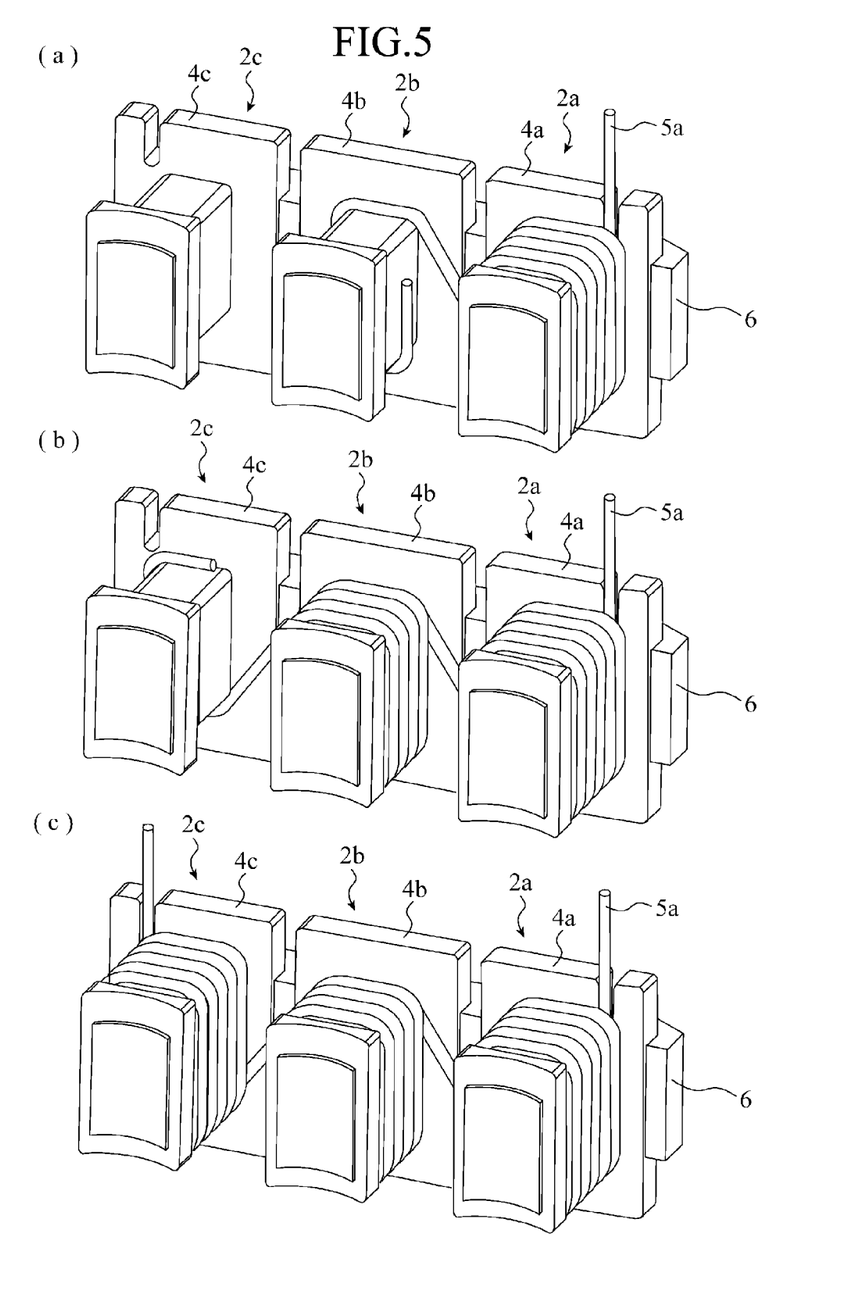
FIG. 5(a) is a perspective view showing routing of the coil wire from a first tooth to a second tooth.
FIG. 5(b) is a perspective view showing routing of the coil wire from the second tooth to a third tooth.
FIG. 5(c) is a perspective view showing the completion of the winding.
Figure 6:
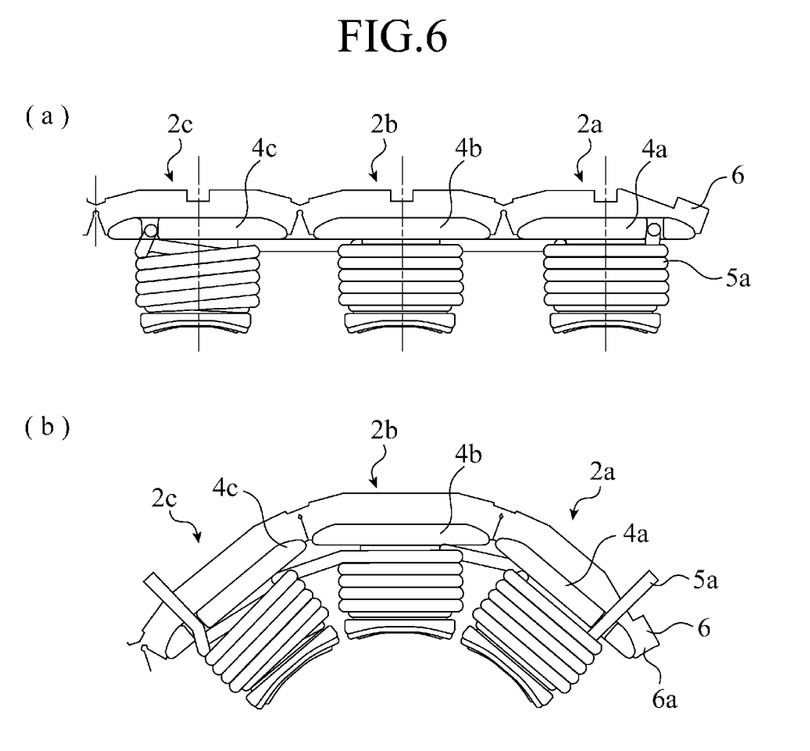
FIG. 6(a) is a top plan view showing the iron core yet to be bent.
FIG. 6(b) is a top plan view showing the bent iron core.

In Embodiment 1, the winding of the coil wires 5 on the iron core 3 in which the plurality of teeth 2 are arranged in a circular form is shown. In contrast with this, in Embodiment 2, winding of coil wires 5 on an iron core 6 in which a plurality of teeth 2 are arranged in a linear form. In FIGS. 4 to 6, the same structural components as those of the stator 1 in accordance with Embodiment 1 shown in FIG. 1 are designated by the same reference numerals as those shown in the figure, and the explanation of the components will be omitted hereafter. In FIGS. 4 to 6, only teeth 2 (2a to 2c) of one set are shown while being extracted from the iron core 6 which constructs a stator 1.

The iron core 6 is comprised of the plurality of teeth 2 which are arranged in a linear form and are connected into an integral body, as shown in FIG. 4, and is constructed in such a way as to be able to be bent between any two adjacent teeth 2 and toward a side of each tooth 2. After this coil wire 5 is wound around each of the teeth 2, the iron core 6 is bent toward each tooth 2 in such a way as to be shaped like a circle, so that the stator 1 is constructed.

Next, a process of winding the coil wires on the iron core 6 constructed as above, and a process of bending the iron core 6 will be explained. As shown in FIG. 5, the process of winding the coil wires 5 on the iron core 6 is the same as the process of winding the coil wires 5 on the iron core 3 as shown in FIG. 2, and the explanation of the winding process of this embodiment will be omitted hereafter. Then, after the winding of the coil wires 5 on the iron core 6 is completed, in the bending process of bending the iron core 6, the iron core 6 is bent toward each tooth 2, as shown in FIG. 6. After that, the stator 1 is constructed by joining contact surfaces 6a of the iron core 6 at both ends of the iron core 6, and forming the iron core into a circular shape.

In a conventional winding method, when routing a coil wire 5 between two adjacent teeth 2, the coil wire 5 is made to extend across an outside portion of an insulator 4. Therefore, when bending the iron core 6 on which the coil wires 5 are wound toward each tooth 2, the coil wires 5 are elongated and the tension caused by the coil wires 5 increases. As a result, there is apprehension that elongation and rub occur in the coil wires 5, and therefore a short circuit occurs.

In contrast with this conventional winding method, in accordance with the winding method of Embodiment 2, when routing a coil wire 5 between adjacent teeth 2, the coil wire 5 is routed in a slanting direction between the opposed faces of the adjacent teeth 2, and is arranged only in an inside portion of each insulator 4. Therefore, when bending the iron core 6 on which the coil wires 5 are wound toward each tooth 2, the tension caused by the coil wires 5 becomes weaker because the distance between the adjacent teeth 2 is reduced. Therefore, elongation and rub of the coil wires 5 can be suppressed as compared with the conventional method, and occurrence of serge and a short circuit can be avoided.

As mentioned above, in the stator in accordance with this Embodiment 2, the iron core 6 in which the plurality of teeth 2 are arranged in a linear form, and which is bent after the coil wires 5 is wound thereon in such a way as to be formed into a circular shape is used, and, when a coil wire 5 is routed between adjacent teeth 2, the coil wire 5 is routed in a slanting direction between the opposed faces of the adjacent teeth 2, and is arranged only in the inside portion of each insulator 4. Therefore, in addition to the advantages provided by Embodiment 1, there is provided an advantage of being able to suppress elongation and rub of the coil wires 5, and avoid occurrence of serge and a short circuit.

Embodiment 3

In Embodiment 3, a stator in which members for easily carrying out winding with a high fill factor when winding a coil wire 5 around each tooth 2 are disposed is shown. Hereafter, an explanation will be made by using an iron core 6, as shown in Embodiment 2, in which a plurality of teeth 2 are arranged in a linear form. In FIGS. 7 to 12, the same structural components as those of the stator 1 in accordance with Embodiment 2 shown in FIGS. 4 to 6 are designated by the same reference numerals as those shown in the figures, and the explanation of the components will be omitted hereafter. Furthermore, in FIGS. 7 to 11, only teeth 2 (2a to 2c) of one set are shown while being extracted from the iron core 6 which constructs the stator 1.

Figure 7:
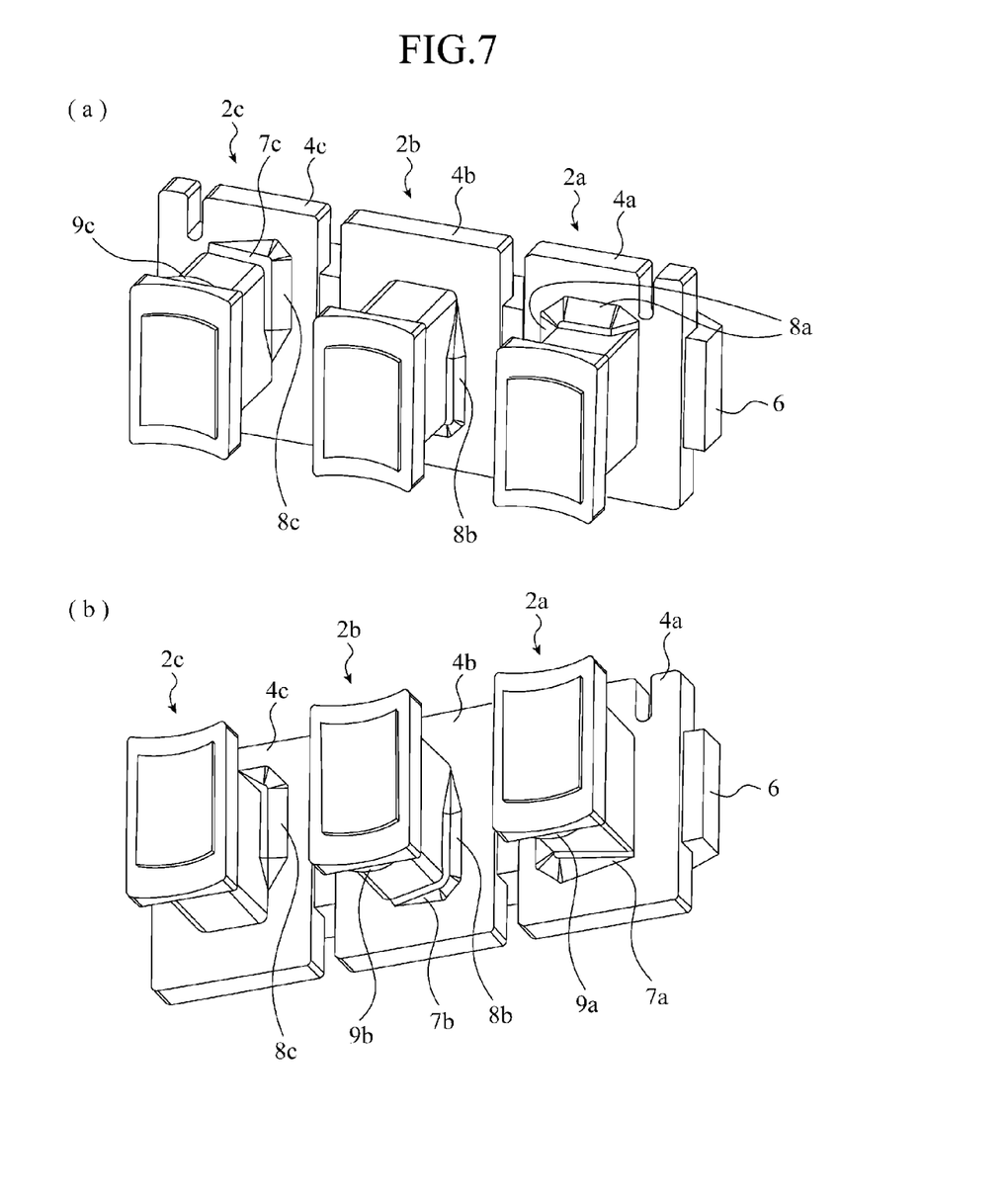
FIG. 7(a) is a perspective view showing the iron core from an upper side.
FIG. 7(b) is a perspective view showing the iron core from a lower side.
Figure 8:
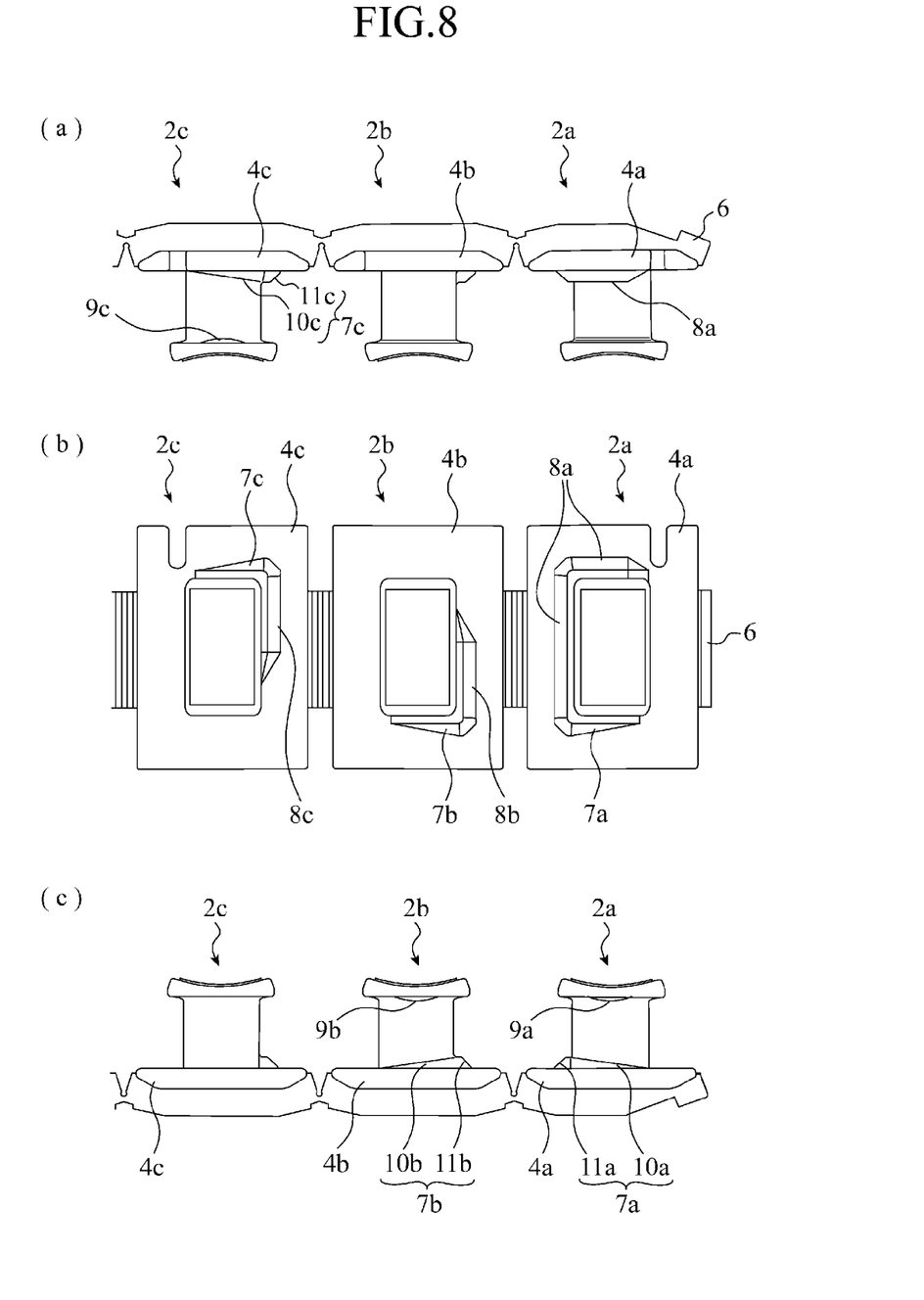
FIG. 8(a) is a top plan view of the iron core.
FIG. 8(b) is a front view of the iron core.
FIG. 8(c) is a bottom view of the iron core.

As shown in FIGS. 7 and 8, a normal winding auxiliary portion 7 (7a to 7i) and an interference prevention portions 8 (8a to 8i) are integrally formed in a basal portion of each insulator 4. Furthermore, a transition auxiliary portion 9 (9a to 9i) is integrally formed in an end portion of each insulator 4.

Figure 12:
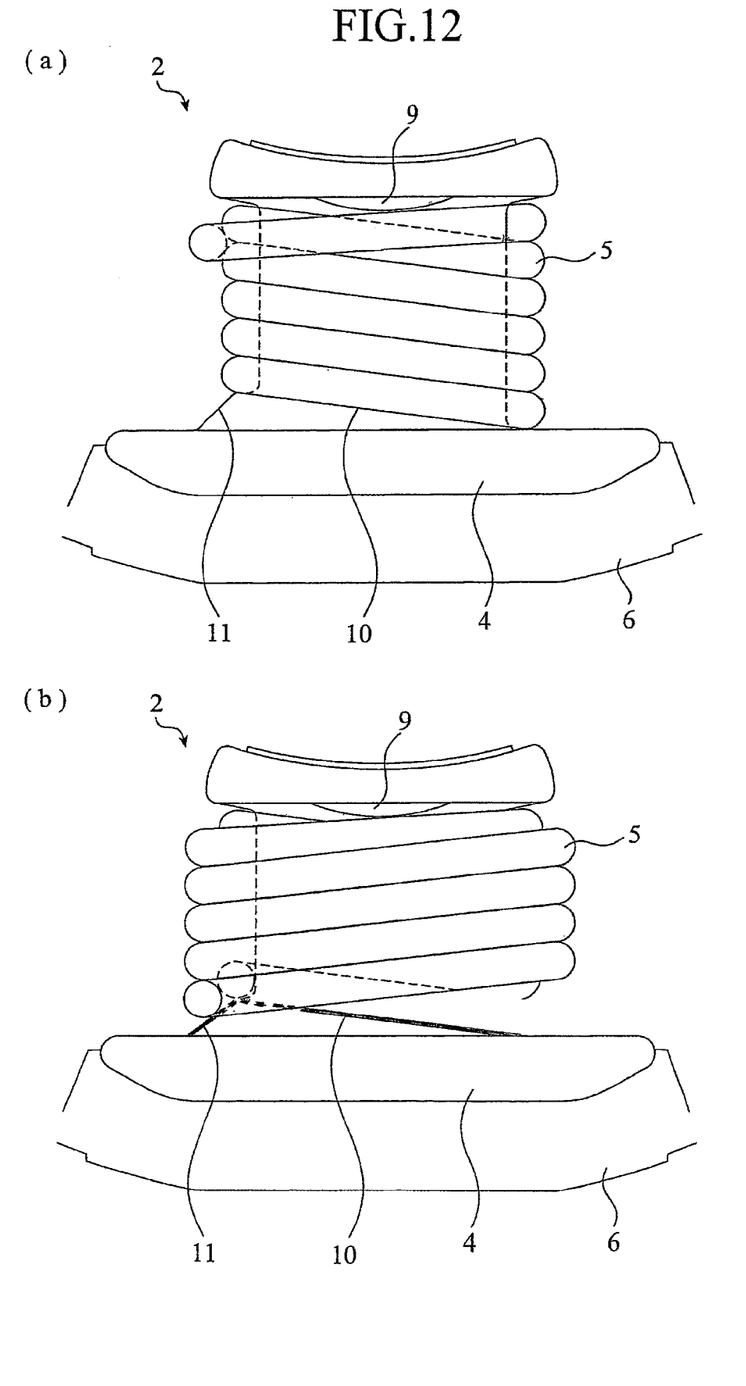
FIG. 12(a) is a bottom view showing a transition of the coil wire from a first layer to a second layer.
FIG. 12(b) is a bottom view showing the wound part of the coil wire in a last row of the second layer.

The normal winding auxiliary portion 7 is a guide for shifting a part of the coil wire 5 to be wound around the tooth 2 by one row with respect to the already-wound coil 5 toward a direction of the axis of the tooth 2, and has a first taper 10 (10a to 10i) disposed on one side thereof and inclined gently. Furthermore, the normal winding auxiliary portion 7 has a second taper 11 (11a to 11i) disposed on another side thereof and inclined more steeply than the first taper 10. As shown in FIG. 12(*b*), this second taper 11 is formed in such a way as to fit a part of the coil wire 5 in a final row of a second layer into a groove formed by the second taper 11 and a part of the coil wire 5 in an upper row of a first layer to prevent the wound coil wire from collapsing.

In this case, the normal winding auxiliary portion 7 is formed at a different position and into a different shape for each tooth 2 according to the part of the coil wire 5 wound around each tooth 2. As shown in FIGS. 7 and 8, the normal winding auxiliary portion 7a is formed along the lower shorter side of the insulator 4a of a first tooth 2 (i.e., the tooth 2a), and has the first taper 10a whose height is increased with distance from the right end of the lower shorter side toward the left end of the lower shorter side. Furthermore, the normal winding auxiliary portion 7b is formed along the lower shorter side of the insulator 4b of a second tooth 2 (i.e., the tooth 2b), and has the first taper 10b whose height is increased with distance from the left end of the lower shorter side toward the right end of the lower shorter side. Furthermore, the normal winding auxiliary portion 7c is formed along the upper shorter side of the insulator 4 of a third tooth 2 (i.e., the tooth 2c), and has the first taper 10c whose height is increased with distance from the right end of the lower shorter side toward the left end of the lower shorter side.

The interference prevention portion 8 is a guide for winding a part of the coil wire 5 which has been shifted toward the next row by the normal winding auxiliary portion 7 in parallel so as to prevent interference with an already-wound part of the coil wire 5 in the front row. Furthermore, the interference prevention portion 8 has a taper in a part thereof so as to prevent interference with the coil wire 5 routed between the opposed faces of the adjacent teeth 2.

In this case, the interference prevention portion 8 is formed at a different position and into a different shape for each tooth 2 according to the part of the coil wire 5 wound around each tooth 2. As shown in FIGS. 7 and 8, the interference prevention portion 8a is formed along the left longer side and upper shorter side of the insulator 4a of the first tooth 2 (i.e., the tooth 2a). Furthermore, the interference prevention portion 8b is formed along the right longer side of the insulator 4b of the second tooth 2 (i.e., the tooth 2b). Furthermore, the interference prevention portion 8c is formed along the right longer side of the insulator 4c of the third tooth 2 (i.e., the tooth 2c).

The transition auxiliary portion 9 is a guide for shifting a part of the coil wire 5 to be wound around the tooth 2 by one layer with respect to the already-wound coil 5 toward a direction of the normal to the axis of each tooth 2, and is formed into an arc shape. In this case, the transition auxiliary portion 9 is formed at a different position and into a different shape for each tooth 2 according to the wound state of the coil wire 5 wound around each tooth 2. As shown in FIGS. 7 and 8, the transition auxiliary portion 9a is formed in the lower shorter side of the insulator 4a of the first tooth 2 (i.e., the tooth 2a). Furthermore, the transition auxiliary portion 9b is formed in the lower shorter side of the insulator 4b of the second tooth 2 (i.e., the tooth 2b). Furthermore, the transition auxiliary portion 9c is formed in the upper shorter side of the insulator 4c of the third tooth 2 (i.e., the tooth 2c).

Although not illustrated, the normal winding auxiliary portions 7d to 7i, the interference prevention portions 8d to 8i, and the transition auxiliary portions 9d to 9i are formed for the remaining insulators 4d to 4i respectively in the same way that the normal winding auxiliary portions, the interference prevention portions, and the transition auxiliary portions are formed for the insulators 4a to 4c respectively.

Figure 9:
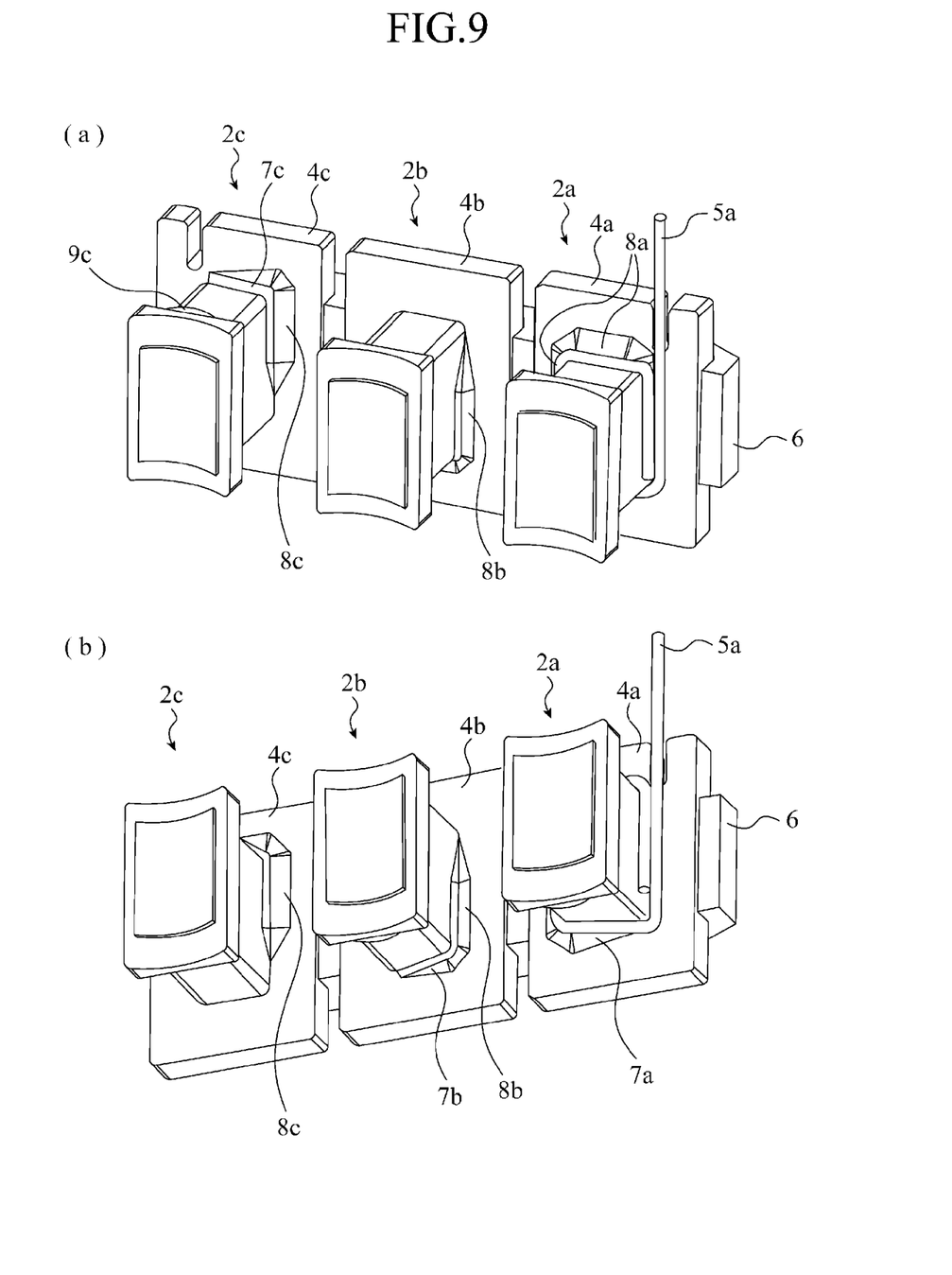
FIG. 9(a) is a perspective view of the wound part from an upper side.
FIG. 9(b) is a perspective view of the wound part from a bottom side.

Next, a winding process of winding the coil wires 5 on the iron core 3 which is constructed as mentioned above will be explained. This winding process of winding the coil wires 5 on the iron core 6 is the same as the winding process of winding the coil wires 5 shown in Embodiment 1, and an explanation of the winding process will be made briefly. In the winding process of winding the coil wires on the iron core 6, as shown in FIG. 9, a coil winding machine winds a coil wire 5a in a first layer around the insulator 4a first. At that time, as shown in FIG. 9(b), while the coil wire 5a is wound in the first row (on a basal portion of the insulator 4a), the coil wire 5a is shifted by one row toward an end portion of the tooth 2a by the normal winding auxiliary portion 7a to make a transition to a second row. The coil wire 5a is then guided toward the right longer side of the insulator by the interference prevention portion 8a while being positioned in the second row, as shown in FIG. 9(a). In this case, the guided coil wire 5a does not interfere with the already-wound coil wire 5a in the first row. After that, the second row and subsequent rows of the coil wire are wound while being guided by the already wound coil wire 5a.

The coil winding machine then winds a second layer of the coil wire 5a around the insulator 4a. At that time, as shown in FIG. 12(a), when causing the coil wire 5a to make a transition to a wire in the second layer, the transition auxiliary portion 9a fits this coil wire 5a into a groove formed by the already wound coil wire 5a in the final row of the first layer and the coil wire 5a in a lower row adjacent to the final row so as to wind the coil wire around the insulator 4a toward the basal portion of the insulator 4a. Furthermore, as shown in FIG. 12(b), when the coil wire 5a is wound in the final row of the second layer, the coil wire 5a is fitted into a groove formed by the second taper 11a and the coil wire 5 in an upper row adjacent to the second taper. As a result, occurrence of collapse of the wound coil wire 5a can be prevented, and the normal winding can be maintained easily.

Figure 10:
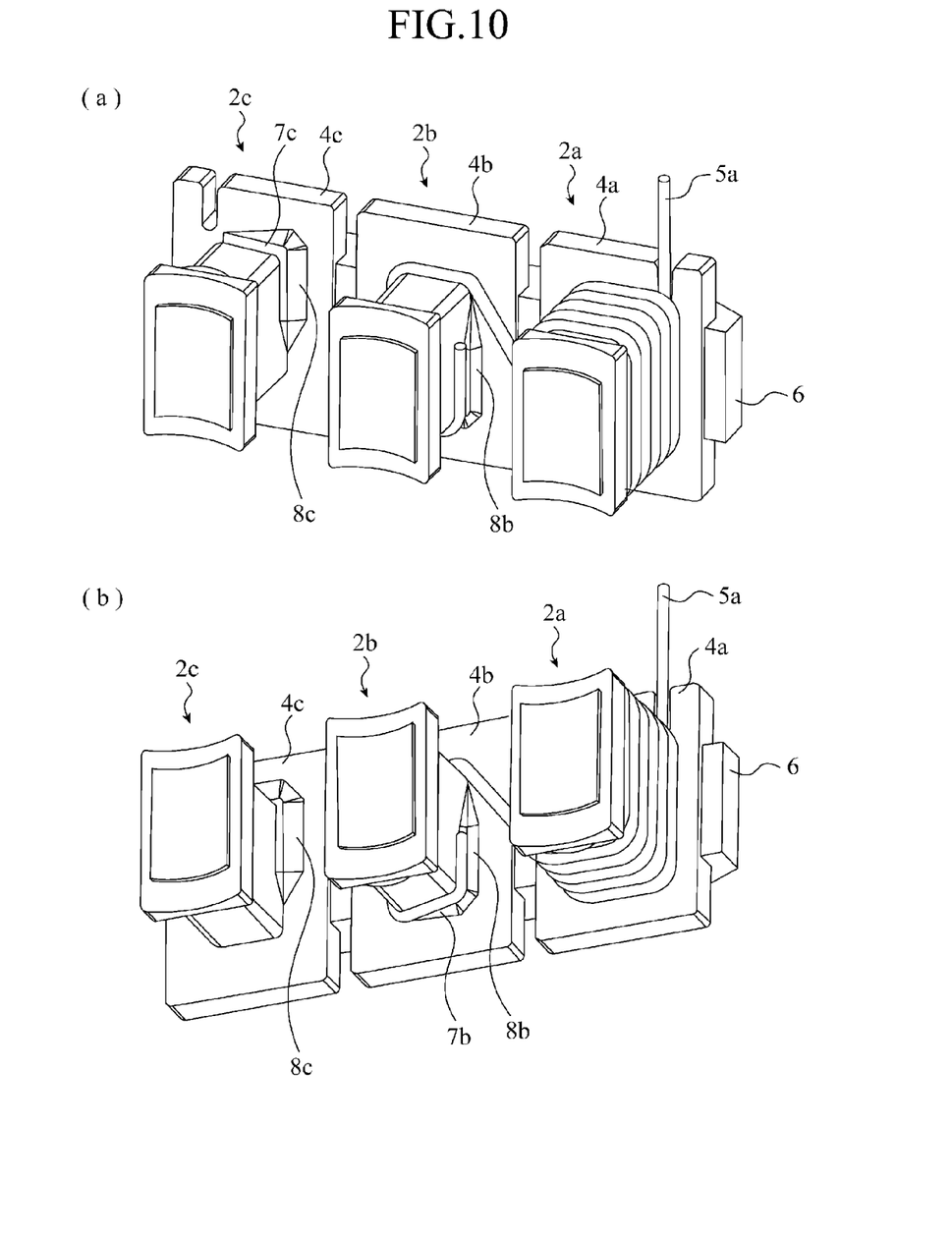
FIG. 10(a) is a perspective view of the wound part from an upper side.
FIG. 10(b) is a perspective view of the wound part from a bottom side.

Then, the coil winding machine routes the coil wire 5a in a slanting direction from the left end of the lower shorter side of the insulator 4a toward the right end of the upper shorter side of the insulator 4b between the left longer side of the insulator 4a and the right longer side of the insulator 4b, as shown in FIG. 10.

The coil winding machine then winds a first layer of the coil wire 5a around the insulator 4b. At that time, as shown in FIG. 10(b), while the coil wire 5a is wound in the first row (on a basal portion of the insulator 4b), the coil wire 5a is shifted by one row toward an end portion of the tooth 2b by the normal winding auxiliary portion 7b to make a transition to a second row. The coil wire 5a is then guided toward the upper shorter side of the insulator by the interference prevention portion 8b while being positioned in the second row, as shown in FIG. 10(a). In this case, the guided coil wire 5a does not interfere with the already-wound coil wire 5a in the first row. After that, the second row and subsequent rows of the coil wire are wound while being guided by the already wound coil wire 5a. The coil winding machine then winds a second layer of the coil wire 5a around the insulator 4b in the same way that it winds the second layer of the coil wire 5a around the insulator 4a.

Figure 11:
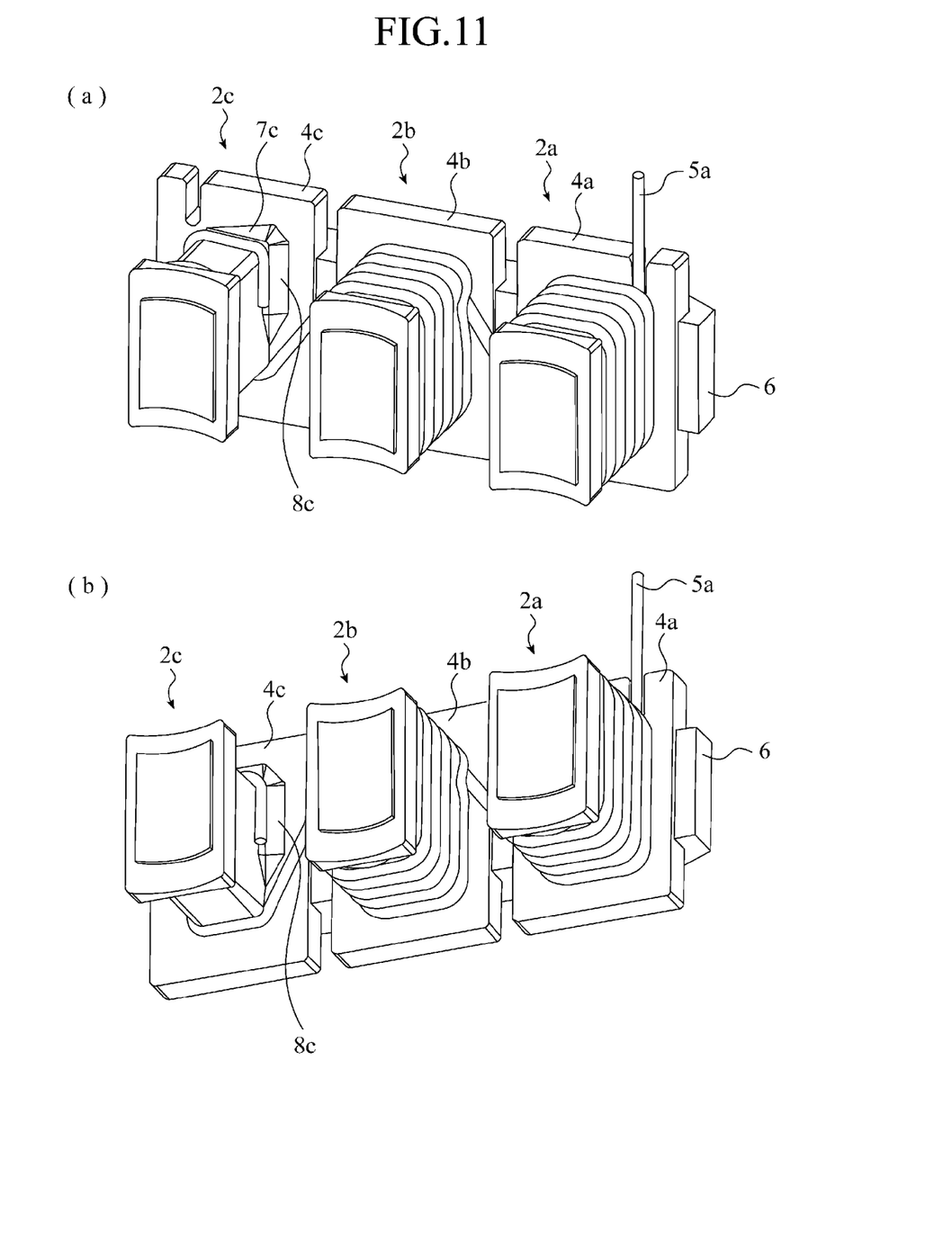
FIG. 11(a) is a perspective view of the wound part from an upper side.
FIG. 11(b) is a perspective view of the wound part from a bottom side.

Then, the coil winding machine routes the coil wire 5a in a slanting direction from the left end of the upper shorter side of the insulator 4b toward the right end of the lower shorter side of the insulator 4c between the left longer side of the insulator 4b and the right longer side of the insulator 4c, as shown in FIG. 11.

The coil winding machine then winds a first layer of the coil wire 5a around the insulator 4c. At that time, as shown in FIG. 11(a), while the coil wire 5a is wound in the first row (on a basal portion of the insulator 4c), the coil wires 5a is shifted by one row toward an end portion of the tooth 2c by the normal winding auxiliary portion 7c to make a transition to a second row. The coil wire 5a is then guided toward the lower shorter side of the insulator by the interference prevention portion 8c while being positioned in the second row, as shown in FIG. 11(b). In this case, the guided coil wire 5a does not interfere with the already-wound coil wire 5a in the first row. After that, the second row and subsequent rows of the coil wire are wound while being guided by the already wound coil wire 5a. The coil winding machine then winds a second layer of the coil wire 5a around the insulator 4c in the same way that it winds the second layer of the coil wire 5a around the insulator 4a.

Accordingly, the coil wire 5a can be wound around the teeth 2a to 2c. Coil wires 5b and 5c are similarly wound around the remaining two sets of teeth 2 (the teeth 2d to 2f and the teeth 2g to 2i) respectively, and the iron core 6 is bent toward each of the teeth 2 and is formed into a circular shape, so that the stator 1 is constructed.

As mentioned above, in the stator in accordance with this Embodiment 3, the normal winding auxiliary portion 7 for facilitating normal winding when the coil wire 5 is wound around each tooth 2, and the interference prevention portion 8 for preventing interference between parts of the coil wire 5 are disposed in the basal portion of each tooth 2, and the transition auxiliary portion 9 for facilitating a transition of the coil wire 5 to the second layer is disposed in the end portion of each tooth 2. Therefore, in addition to the advantages provided by Embodiments 1 and 2, there is provided an advantage of being able to facilitate the winding of the coil wire 5 around each tooth and improve the fill factor of the coil wire 5.

In Embodiment 3, the explanation is made by using the iron core 6 in which the plurality of teeth 2 are arranged in a linear form. This embodiment is not limited to this example. This embodiment can be similarly applied to an iron core 3, as shown in Embodiment 1, in which a plurality of teeth 2 are arranged in a circular form. Furthermore, in Embodiment 3, the normal winding auxiliary portion 7 is formed in a shorter side of each tooth 2. This embodiment is not limited to this example. The normal winding auxiliary portion can be alternatively formed in a longer side of each tooth.

Many widely different embodiments of the present invention may be constructed without departing from the spirit and scope of the present invention. It should be understood that the present invention is not limited to the specific embodiments described in the specification, except as defined in the appended claims.

What is claimed is:

1. A stator comprising:
   an iron core in which a plurality of teeth are connected into an integral body; and
   coil wires each of which is wound in series around each set of a predetermined number of teeth included in said plurality of teeth,
   wherein each of said coil wires is routed in a slanting direction between opposed faces of two adjacent teeth in each set of said predetermined number of teeth, so that each of said coil wires makes a transition from a wire wound around one of said two adjacent teeth to a wire wound around another one of said two adjacent teeth, and
   wherein in each of said plurality of teeth, an interference prevention portion is formed, said interference prevention portion having a taper for preventing interference with the coil wire routed between the opposed faces of the two adjacent teeth.

2. The stator according to claim 1, wherein in each of said plurality of teeth, a normal winding auxiliary portion is formed, said each normal winding auxiliary portion is configured to shift a part of the coil wire to be wound around said each tooth by one row with respect to a part of the coil wire already wound around said each tooth toward a direction of a longitudinal axis of said each tooth.

3. The stator according to claim 1, wherein said interference prevention portion is configured to prevent a part of the coil wire to be wound around said each tooth from interfering with a part of the coil wire already wound around said each tooth.

4. The stator according to claim 1, wherein in each of said plurality of teeth, a transition auxiliary portion is formed, said each transition auxiliary portion is configured to shift a part of the coil wire to be wound around said each tooth by one layer with respect to a part of the coil wire already wound around said each tooth toward a direction of a normal to a longitudinal axis of said each tooth.

5. The stator according to claim 1, wherein said plurality of teeth are arranged in a linear form in the iron core, and said iron core is configured in such a way as to be able to be bent toward each of said plurality of teeth.

6. The stator according to claim 1, further comprising a plurality of insulators each attached to a corresponding tooth, wherein each coil wire is arranged only in an inside portion of the corresponding insulator.

7. The stator according to claim 2, wherein each of the normal winding auxiliary portion is formed at a different position and into a different shape for each tooth according to a part of the coil wire wound around each tooth.

8. An electric motor provided with a stator, said stator comprising:
   an iron core in which a plurality of teeth are connected into an integral body; and
   coil wires each of which is wound in series around each set of a predetermined number of teeth included in said plurality of teeth,
   wherein each of said coil wires is routed in a slanting direction between opposed faces of two adjacent teeth in each set of said predetermined number of teeth, so that each of said coil wires makes a transition from a wire wound around one of said two adjacent teeth to a wire wound around another one of said two adjacent teeth, and
   wherein in each of said plurality of teeth, an interference prevention portion is formed, said interference prevention portion having a taper for preventing interference with the coil wire routed between the opposed faces of the two adjacent teeth.

9. The stator according to claim 8, further comprising a plurality of insulators each attached to a corresponding tooth, wherein each coil wire is arranged only in an inside portion of the corresponding insulator.

10. The stator according to claim 8, wherein in each of said plurality of teeth, a normal winding auxiliary portion is formed, said each normal winding auxiliary portion is configured to shift a part of the coil wire to be wound around said each tooth by one row with respect to a part of the coil wire already wound around said each tooth toward a direction of a longitudinal axis of said each tooth.

11. The stator according to claim 10, wherein each of the normal winding auxiliary portion is formed at a different position and into a different shape for each tooth according to a part of the coil wire wound around each tooth.

12. The stator according to claim 8, wherein said interference prevention portion is configured to prevent a part of the coil wire to be wound around said each tooth from interfering with a part of the coil wire already wound around said each tooth.

13. The stator according to claim 8, wherein in each of said plurality of teeth, a transition auxiliary portion is formed, said each transition auxiliary portion is configured to shift a part of the coil wire to be wound around said each tooth by one layer with respect to a part of the coil wire already wound around said each tooth toward a direction of a normal to a longitudinal axis of said each tooth.

14. The stator according to claim 8, wherein said plurality of teeth are arranged in a linear form in the iron core, and said iron core is configured in such a way as to be able to be bent toward each of said plurality of teeth.

* * * * *